(12) United States Patent
Bolukbasi et al.

(10) Patent No.: US 8,376,275 B2
(45) Date of Patent: Feb. 19, 2013

(54) ENERGY ABSORBING STRUCTURE FOR AIRCRAFT

(75) Inventors: Akif O. Bolukbasi, Phoenix, AZ (US);
Thomas R. Baxter, Marysville, WA (US); Tuan A. Nguyen, Mukllteo, WA (US); Mostafa Rassaian, Bellevue, WA (US); Kevin R. Davis, Covington, WA (US); William J. Koch, Bellevue, WA (US); Lee C. Firth, Renton, WA (US)

(73) Assignee: The Boeing Company, Chicago, IL (US)

( * ) Notice: Subject to any disclaimer, the term of this patent is extended or adjusted under 35 U.S.C. 154(b) by 825 days.

(21) Appl. No.: 11/636,056

(22) Filed: Dec. 8, 2006

(65) Prior Publication Data
US 2009/0206202 A1 Aug. 20, 2009

(51) Int. Cl.
*B64C 1/00* (2006.01)

(52) U.S. Cl. ....................................... 244/119; 244/121

(58) Field of Classification Search .................. 244/119, 244/117 R, 121, 139, 140, 138 R, 118.2
See application file for complete search history.

(56) References Cited

U.S. PATENT DOCUMENTS

| | | | |
|---|---|---|---|
| 4,593,870 A | 6/1986 | Cronkhite et al. | |
| 4,606,961 A * | 8/1986 | Munsen et al. | 428/119 |
| 5,069,318 A | 12/1991 | Kulesha et al. | |
| 5,451,015 A * | 9/1995 | Cronkhite et al. | 244/135 R |
| 5,542,626 A | 8/1996 | Beuck et al. | |
| 6,427,945 B1 | 8/2002 | Bansemir | |
| 6,601,886 B1 | 8/2003 | Thayer | |
| 6,620,484 B1 * | 9/2003 | Bolukbasi et al. | 428/102 |
| 6,688,427 B2 * | 2/2004 | Cole | 182/113 |
| 6,959,894 B2 | 11/2005 | Hayashi | |
| 2004/0011927 A1 | 1/2004 | Christman et al. | |
| 2008/0093503 A1 * | 4/2008 | Cacciaguerra | 244/119 |

FOREIGN PATENT DOCUMENTS

| | | |
|---|---|---|
| GB | 1108762.4 | 6/2011 |
| JP | 2006341651 A | 12/2006 |
| WO | WO02/46036 A1 | 6/2002 |

* cited by examiner

*Primary Examiner* — Philip J Bonzell
(74) *Attorney, Agent, or Firm* — Parsons Behle & Latimer (57) ABSTRACT

Energy absorbing structure disposed beneath the cargo area of an aircraft provides maximum energy absorption and structural strength using carbon fiber reinforced epoxy composites. The energy absorbing structure uses laminated stanchions having ply drop-offs to produce stable, progressive crushing of the stanchions during a wheels-up crash landing. Integrally formed flanges on the stanchions allow direct mounting of the stanchions on the structural members of the aircraft, without the need for specialized fittings.

15 Claims, 6 Drawing Sheets

ENERGY ABSORBING STRUCTURE FOR AIRCRAFT

BACKGROUND OF THE INVENTION

1. Field of the Invention

This invention broadly relates to energy absorbing structures, and deals more particularly with energy absorbing elements such as stanchions and assembly fittings used in aircraft.

2. Description of the Related Art

An important objective in the design of modern military and civilian aircraft is the protection of occupants in the event of a survivable crash. Crash injuries may be caused by high acceleration loads experienced by the occupants, or the loss of structural integrity of the aircraft. Crashworthy designs for aircraft require the fuselage to provide energy absorption in order to slow down the aircraft during a crash impact. Controlled deceleration of the aircraft during impact reduces inertial loads on the occupants, and assists in maintaining structural integrity of the aircraft. The area beneath the fuselage floor can form an important part of the energy absorption system in the event of a crash, since this area is normally the part of the aircraft that is initially crushed during ground impact.

Earlier generations of crash energy absorption systems relied heavily on metal components to absorb aircraft kinetic energy during a crash. However, the increasing use of composite materials in aircraft designs has resulted in newer crash energy absorption systems that rely on components formed of composite materials. Energy absorbing systems that use composite materials present a design challenge because these materials are often brittle and do not exhibit either plasticity or high elongation prior to failure. In order to solve these design problems, a number of solutions have been proposed, including varying the density of stitching used in stitched composite structures, and using so called ply drop-offs to sustain a crushing process after it is initiated. These design solutions may sometimes be difficult to incorporate into manufacturing processes without significant cost increases. In addition, previous design solutions were limited to protecting occupants from impact forces acting vertically on the aircraft, rather than from off-vertical forces which can be imposed on the fuselage if the aircraft rolls slightly before ground impact.

Accordingly, there is a need for energy absorbing structure for aircraft that both improves crashworthiness and is cost effective to implement. The invention is directed towards satisfying this need.

BRIEF SUMMARY OF THE INVENTION

In accordance with one aspect of the invention, an energy absorbing structural member comprises an elongated body having first and second opposite ends, and first and second opposite sides. The body contains laminated plies of a reinforced composite material wherein the plies have varying lengths forming steps along the length of the member such that the compression strength of the member is progressively less from the first end to the second end. At least one reinforced flange on the body is tapered from the first to the second end, and functions to both reinforce the structural member and promote elastic stability during crushing. The laminated plies are preferably formed from reinforced composite materials such as a carbon fiber reinforced epoxy. In one embodiment, the structural member includes first and second reinforcing flanges extending along the length of the body, and third and fourth flanges integrally formed with the first and second flanges, for attaching the structural member to the floor of an aircraft.

In accordance with another aspect of the invention, an aircraft is provided, comprising: a fuselage; a floor including floor beams within the fuselage; and, an energy absorbing structure between the floor and the fuselage for absorbing energy in the event the fuselage is impacted during a crash. The energy absorbing structure includes a plurality of energy absorbing stanchions extending between the floor beams and the fuselage. Each of the stanchions includes a first end adjacent the floor beam and a second end adjacent the fuselage, wherein the compression strength of each of the stanchions progressively decreases from the first end to the second end. The stanchions are axially oriented at multiple angles relative to the floor beams so as to absorb lateral loads caused by non-vertical impacts when the aircraft rolls slightly before ground impact. The stanchions contain laminated plies of reinforced composite material, wherein the plies have varying lengths forming reduced ply steps along the length of the stanchion. The aircraft further comprises cross beams extending transverse to the floor beams, and first and second fittings for attaching each of the stanchions to both a floor beam and a cross beam. The stanchions preferably include a pair of spaced apart tapered flanges, which contribute to the elastic stability of the stanchions during crushing.

According to another aspect of the invention, an energy absorbing floor structure for an aircraft is provided, comprising: a floor; at least one floor beam for supporting the floor; at least one support element extending transverse to the floor beam; a fuselage frame; and, a plurality of energy absorbing structural members extending between the floor beam and the fuselage frame. Each of the structural members has a first set of flanges extending from a first end of the member to a second end of the member, and a second set of flanges engaging the support element. Means are provided for attaching each of the structural members to the fuselage frame, the floor beam and the support element. The structural members are formed from composite material and the first and second flanges may be formed integral with each other. The fastening means includes a first set of fasteners extending through each of the structural members into the floor beam, and a second set of fasteners extending through the second set of flanges into the support element. The structural members are formed from laminated plies and include ply drop-offs along their length, or alternatively the flanges may be tapered downwardly such that failure begins at the lower end of the member.

The energy absorbing floor structure of the invention provides a high level of energy absorbing capability at minimal cost and reduced weight. The design of the energy absorbing structure promotes controlled failure so that maximum energy is absorbed. Crush initiation of the cargo floor stanchions begins at the lower attachment of the stanchions to the fuselage frame, and subsequent progressive crushing of the stanchions proceeds in a stable manner while the stanchions maintain attachment to the cargo floor beams. This progressive, stable crushing reduces the possibility of stanchion buckling, and aids in maintaining the structural integrity of the cargo floor attachment during a crash.

These and other features, aspects and advantages of the invention will become better understood with reference to the following drawings, description and claims.

DETAILED DESCRIPTION OF THE INVENTION

Figure 1:
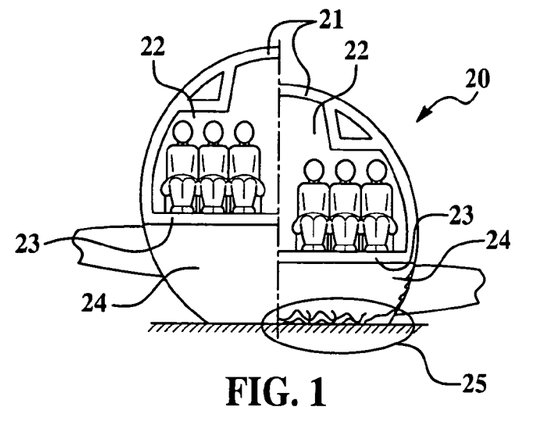
FIG. 1 is a transverse, cross sectional view of an aircraft showing the space beneath the fuselage floor both before and after crushing due to ground impact.

Referring first to FIG. 1, an aircraft generally indicated by the numeral 20 has a cylindrical fuselage 21 defining an interior space that is separated into upper and lower lobes by a floor 23. The upper lobe includes a passenger compartment 22 while the lower lobe contains a cargo area 24. A volume of space below the cargo area 24 is normally available to contain energy absorption structure and constitutes the part of the aircraft 20 that is first to impact the ground in the event of a wheels up landing. The left side of the aircraft 20 shown in FIG. 1 depicts the condition of the cargo area 24 before impact, while the right side of FIG. 1 shows the aircraft having impacted the ground during a crash, producing a crush area 25 where part of the fuselage 21 and internal support structure collapse. To improve crashworthiness, it is desirable that the structure within the crush area 25 crushes in a stable manner in order to provide the required energy absorption while maintaining the structural integrity of the aircraft 20, to the extent possible. Thus, in designing the energy absorption structure, the structure must meet both minimum crush energy requirements for the particular application, and the design load requirements for the aircraft.

Figure 2:
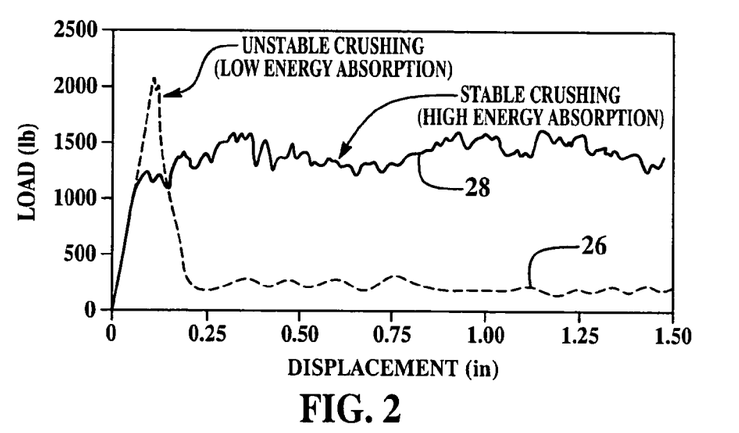
FIG. 2 is a graph of typical load-deflection test data for crushing composite structures, depicting both stable and unstable crushing.

FIG. 2 is a graph illustrating the difference in energy absorption between stable and unstable crush events. Plots 26 and 28 illustrate the displacement of energy absorbing structure as a function of load. As shown by plot 26, the energy absorbing structure experiences early, peak loading which typically results in rapid failure of structural support components, usually in the form of buckling, breaking or shattering. Following failure, the structural support components carry a relatively low level of load, and thus absorb a relatively low amount of energy. In contrast, an energy absorbing structural design that results in stable crushing, indicated by the plot 28, sustains a higher level of loading over a longer duration, thus absorbing a larger amount of energy compared to a design that produces unstable crushing. An energy absorbing structural design producing stable crushing, as exemplified by plot 28, typically exhibits relatively high plasticity and high elongation prior to failure.

Figure 3:
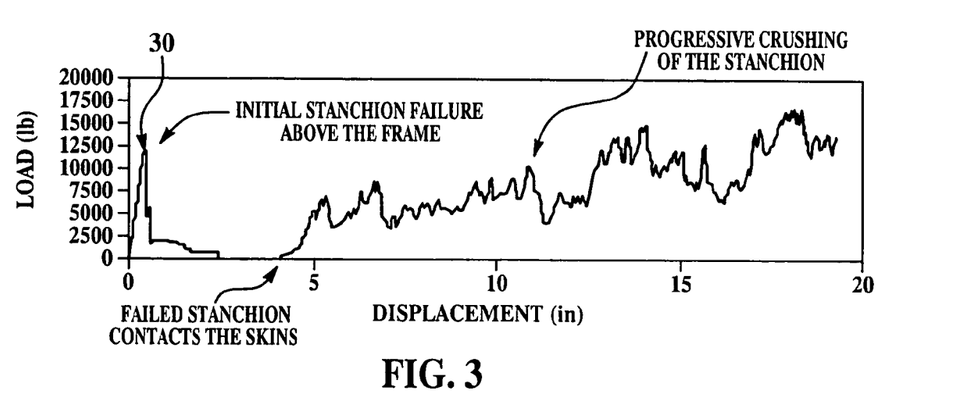
FIG. 3 is a graph showing load-deflection test data for the energy absorbing structure of the invention.
Figure 4:
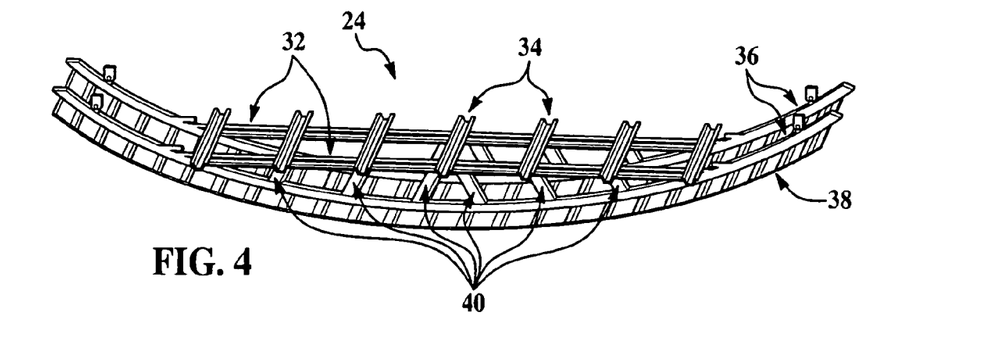
FIG. 4 is a perspective view of a lower section of an aircraft having the energy absorbing structure of the invention.

FIG. 3, which will be discussed later in more detail, is a graph showing the load-deflection test data for crushing of an energy absorbing member in accordance with the invention. The energy absorbing member comprising a later discussed stanchion initially experiences a peak load at 30, as its connection to an outer frame member fails. Next, the stanchion contacts the outer skin of the fuselage 20, resulting in gradual loading of the stanchion as the stanchion progressively crushes.

Figure 5:
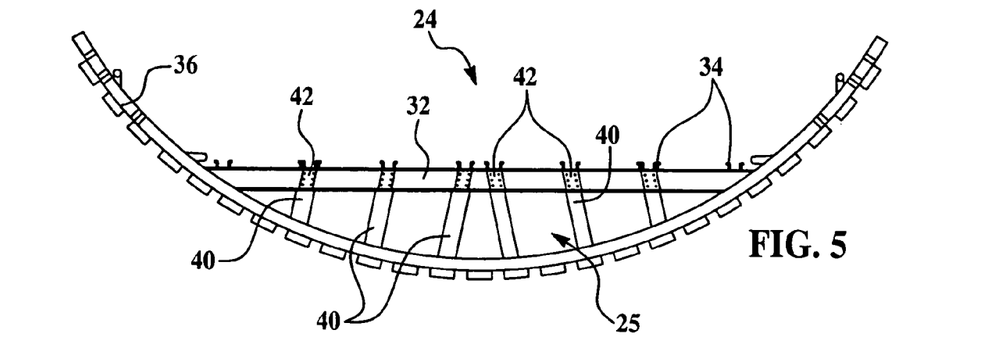
FIG. 5 is a front view of the section of the aircraft shown in FIG. 4.
Figure 7:
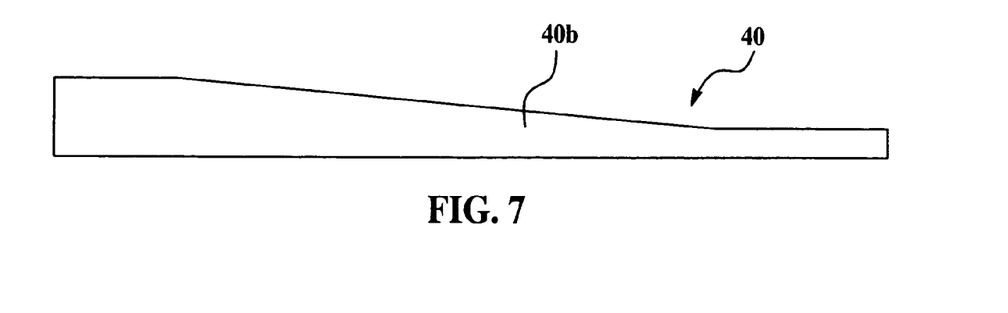
FIG. 7 is a side elevational view of the stanchion shown in FIG. 6.
Figure 8:
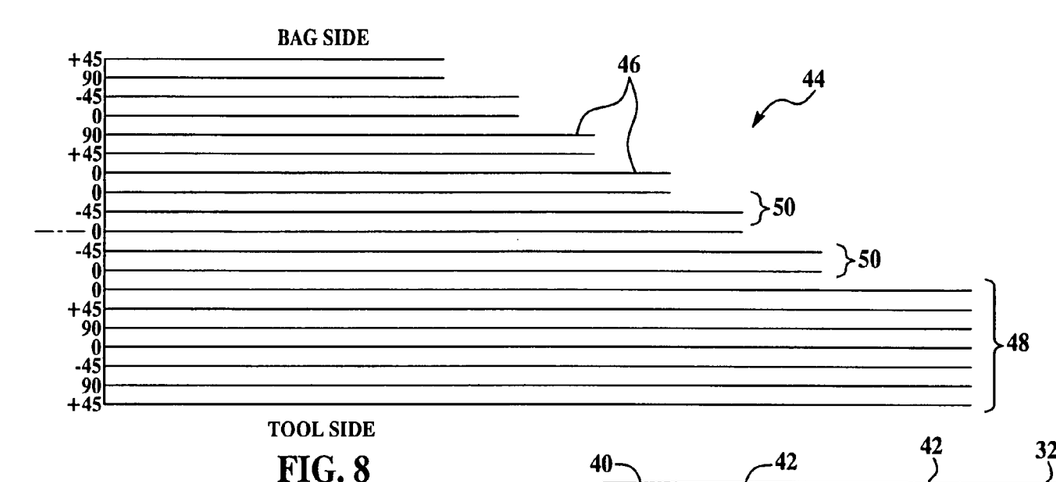
FIG. 8 is a diagrammatic view showing one ply lay-up that may be used in fabricating the stanchion shown in FIG. 6.
Figure 9:
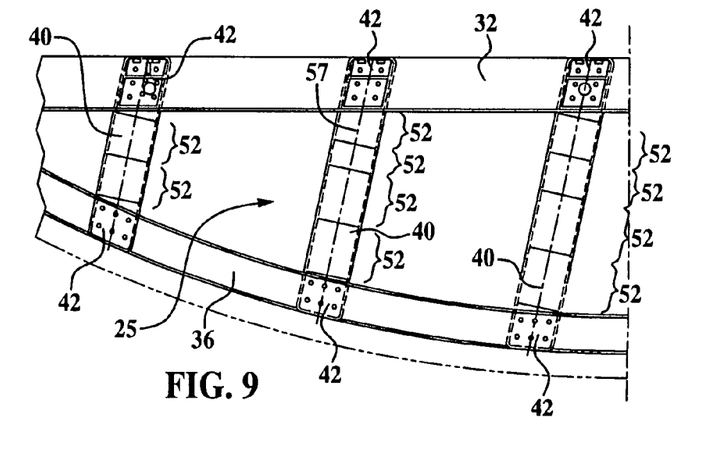
FIG. 9 is an enlarged, fragmentary view of the energy absorbing structure, and depicting each of the crush zones in the stanchions.

Referring now also to FIGS. 4-14, the cargo area 24 includes a plurality of transversely extending floor beams 32 connected at their outer ends to a curved fuselage frame 36, and supported by a plurality of stanchions 40. The opposite ends of stanchions are respectively connected to the floor beams 32 and fuselage frames 36. A plurality of longitudinal beam members in the form of roller trays 24 are supported by the floor beams 32 and extend transversely thereto. The roller trays 24 include rollers 58 (FIG. 14) which support cargo containers (not shown) within the cargo area 24. As best shown in FIGS. 5 and 9, the stanchions 40 in combination with the fuselage frame 36 and floor beams 32, form energy absorbing structure disposed within the crush zone 25, near the bottom of the fuselage 21.

Figure 6:
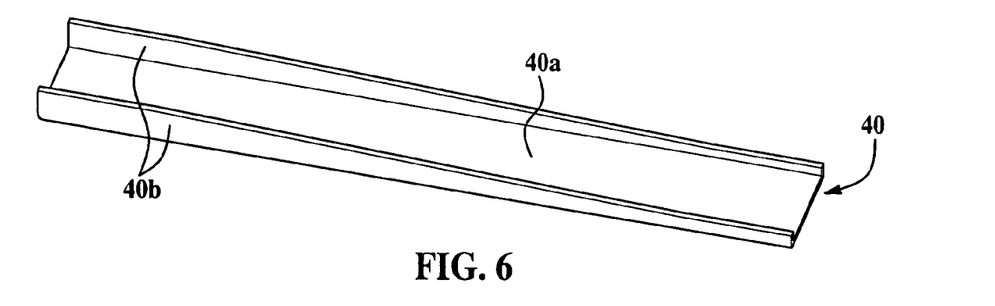
FIG. 6 is a perspective view of a stanchion forming part of the energy absorbing structure.

Each of the stanchions 40 is generally C-shaped in cross section and comprises a main, flat body portion 40a, and a pair of spaced apart, generally parallel flanges 40b. The flanges 40b are tapered such that their height at one end of the stanchion 40 that is attached to floor beams 32 narrows to a lesser height at the other end of the stanchion 40 that is attached to the fuselage frame 36.

The stanchions 40 are of unitary construction formed of laminated plies of a reinforced polymer-based material, which may comprise a fiber reinforcement held in a polymer matrix such as a thermosetting or thermoplastic resin. In the present description, it is to be understood that "reinforced polymer-based material" includes various non-homogeneous polymer-based materials, commonly referred to as "reinforced composites, carbon-fiber composites" or similar terms used in the art. In one embodiment, stanchions 40 are formed from a layup 44 (FIG. 8) comprising multiple plies 46 of epoxy impregnated carbon fiber tape or fabric, fabricated using conventional layup techniques. The plies 46 are arranged so that their respective directions of orientation alternate at different angles in order to obtain the stiffness of the cured laminate. The plies 46 may be arranged in groups 48, 50 having differing lengths. In FIG. 8, for example, it can be seen that a first group of plies 48 extends the entire length of the stanchion 40 and comprises a thickness of 7 plies arranged in a 0/+45/90/0/−45/90/+45 configuration. The first group 48 of plies is followed by successive groups 50 each comprising two plies, which are of successively shorter lengths.

The progressively shorter ply groups 48, 50 may be referred to as ply drop-offs, which means that the first end of the stanchion 40 that is connected to the floor beams 32 has maximum ply thickness, and the ply layers 46 progressively drop-off toward the opposite end of the stanchion 40 so that the minimum number of plies 46 occurs at the end of the stanchion 40 that is attached to the fuselage frame 36. These ply drop-off result in the cross sectional area of the stanchion becoming progressively greater along its length. In other words, the cross sectional area of the stanchion 40 is tailored along its length. The tapering of the flanges 40b also contributes to the tailoring of stanchion cross sectional area. As best seen in FIG. 9, the ply drop-off arrangement used in stanchions 40 creates a plurality of crush zones 52. Due to the stepped cross sectional areas created by the ply drop-offs, the compressive strength of the stanchion 40 progressively decreases from the end of the stanchion 40 connected to the floor beam 32 to the other end of the stanchion. As will be discussed below, the ply drop-offs creating the successive crush zones 52 results in controlled, stable crushing, rather than buckling or shattering of the stanchion 40 during a crash.

Figure 12:
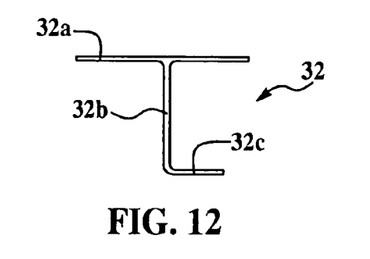
FIG. 12 is a cross sectional view of a floor beam shown in FIGS. 5 and 9.
Figure 13:
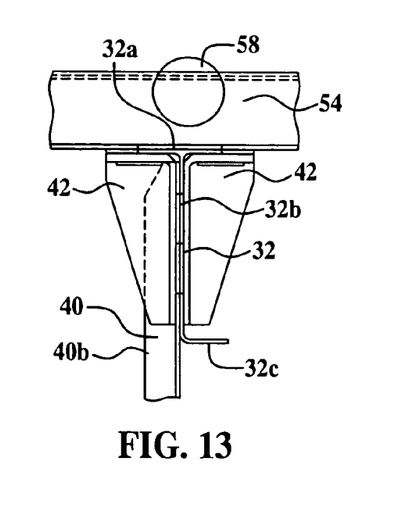
FIG. 13 is a fragmentary, cross sectional view showing the attachment of the stanchions to the floor beam and roller tray.
Figure 14:
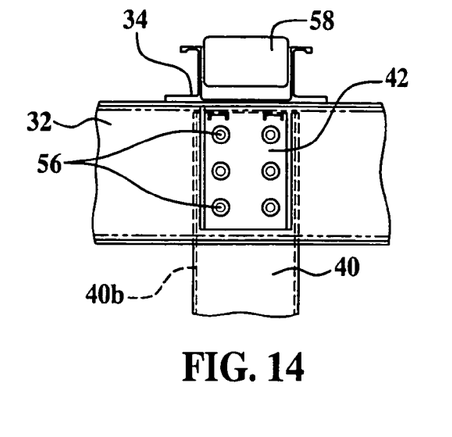
FIG. 14 is a front view of the stanchion attachment shown in FIG. 13.

As best seen in FIGS. 12 and 13, each of the floor beams 32 comprises a central web 32b connecting a flat cap 32a with a lower flange 32c. The base of the roller tray 54 rests on the flat cap 32a. The upper end of each stanchion 40 is secured to one face of a web 32b by means of a pair of fittings 42. One of the fittings 42 is disposed within the channel formed by the stanchion 40, and engages the flat body 40a, in face-to-face contact. A second fitting 42 engages the opposite face of the web 32b, so that the combination of the stanchion 40 and floor beam 32 are sandwiched between the two fittings 42. Suitable fasteners such as Hi-Lok® airframe fasteners 56 are used to draw the fittings 42 toward each other, thereby securely fastening the stanchion 40 to the floor beam 32. Each of the fittings 42 further includes an upper flange 42c reinforced by a pair of triangularly shaped side flanges 42b. Additional Hi-Lok® fasteners 56 pass through flange 42c in order to secure the fittings 42 to the roller tray 54. Hy-lock or similar fasteners may be used to attached the lower ends of the stanchions 40 to the fuselage frame 36.

Figures 10, 11:
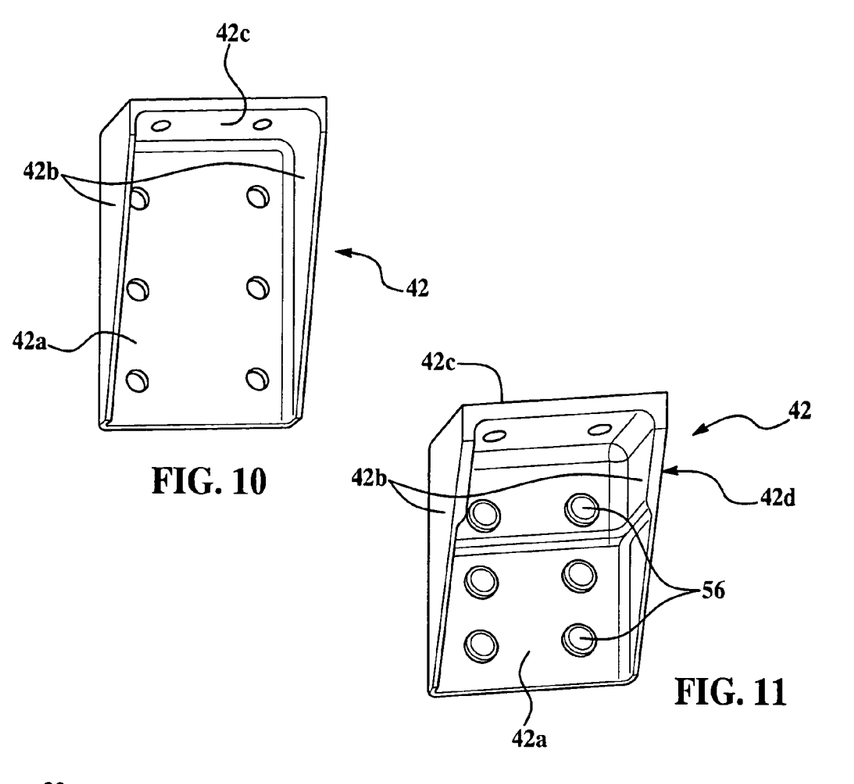
FIG. 10 is a perspective view of a metal fitting used for attaching the stanchion to a floor beam.
FIG. 11 is a perspective view of a composite material fitting used for attaching the stanchion to a floor beam.

The fittings 42 may be constructed of metal such as aluminum or titanium as shown in FIG. 10. Alternately, the fittings 42 may comprise a composite material, such as laminated plies of epoxy impregnated carbon fiber as shown in FIG. 11. An area of increased ply thickness 42d may be provided at the upper end of the fitting 42 to provide additional strength.

Figure 15:
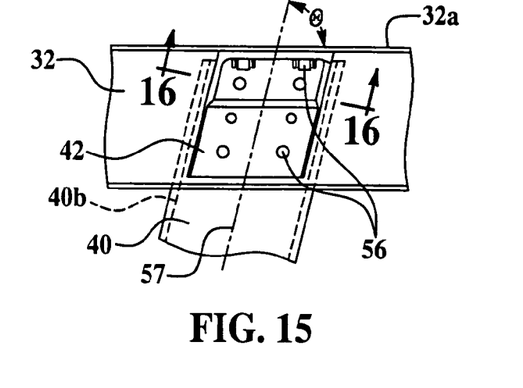
FIG. 15 is an enlarged, fragmentary view showing a single angularly oriented stanchion.
Figure 16:
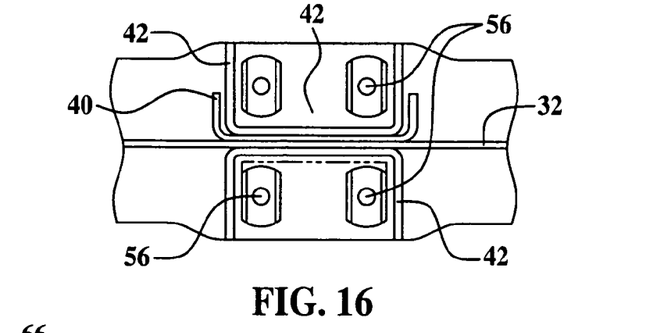
FIG. 16 is a sectional view taken along the line 16-16 in FIG. 15.
Figure 17:
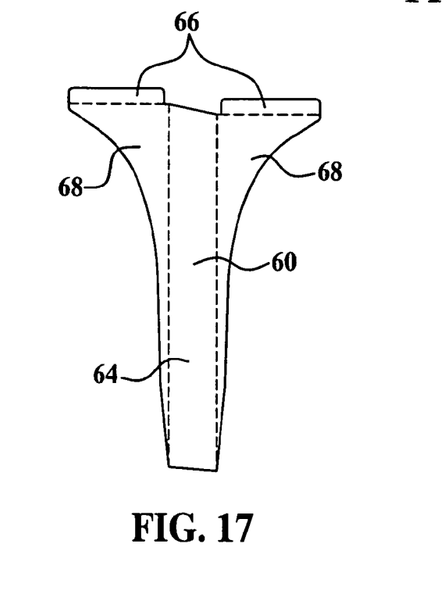
FIG. 17 is a plan view of a lay-up blank for forming a one piece stanchion in accordance with an alternate embodiment of the invention.
Figure 18:
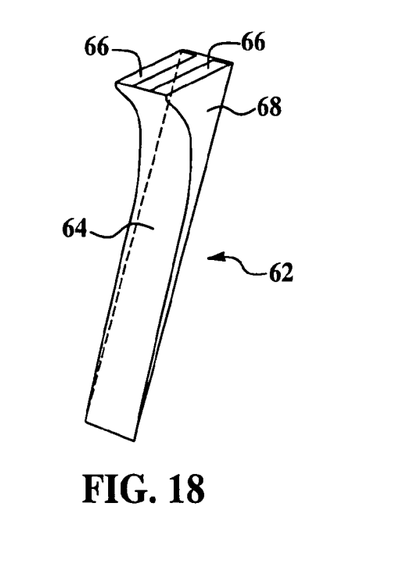
FIG. 18 is a perspective view of a stanchion formed from the blank shown in FIG. 17.
Figure 19:
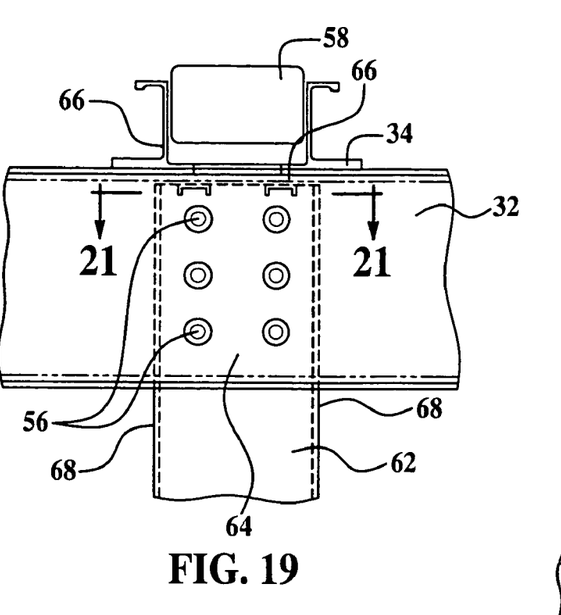
FIG. 19 is an enlarged, fragmentary front view showing the attachment of the stanchion of FIG. 18 to a roller tray.
Figure 20:
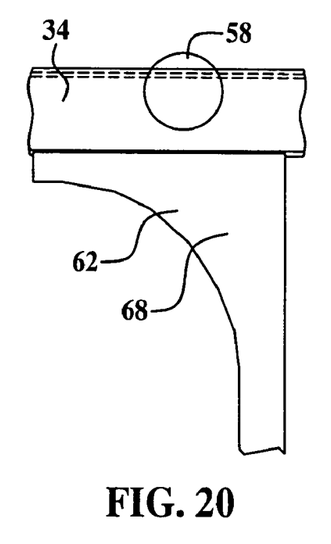
FIG. 20 is a side view of the stanchion attachment shown in FIG. 19.
Figure 21:
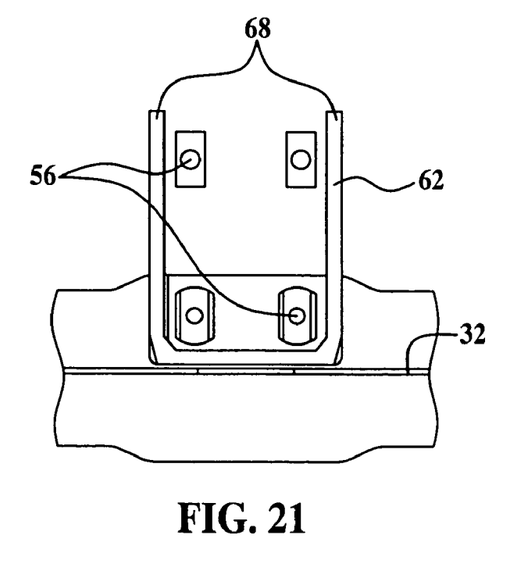
FIG. 21 is a sectional view taken along the line 21-21 in FIG. 19.

As best shown in FIGS. 5, 9 and 15, the stanchions 40 may be arranged such that their central axes 57 form an angle Φ relative to the longitudinal axis of the corresponding floor beam 32. Thus, stanchions 40 are effectively inclined from vertical when the aircraft 20 is level. As best shown in FIG. 5, the stanchions 40 are arranged in two groups respectively on opposite sides of the center line of the fuselage 21. As a result of this angular configuration, each of the stanchions 40 is capable of absorbing energy resulting from partial side loads on the fuselage 21 during a crash.

Upon ground impact during a wheels up "belly" landing, the stanchions 40 will fail near the fasteners securing the stanchions 40 to the fuselage frame 36, following which the lower ends of the stanchions 40 are driven by the impact into contact with the fuselage skin (not shown), placing the stanchions 40 in compression. The resulting load deflection occurring during these two events is shown in FIG. 3. As previously mentioned, initial loading of the stanchions 40 results in a peak load that rapidly diminishes when the stanchions 40 near the fasteners holding the stanchion 40 to the fuselage frame 36. The load briefly goes to zero until the stanchions 40 contact the fuselage skin, following which the stanchions 40 are then gradually loaded. The plies of the stanchions 40 having the longest length, i.e. ply group 48 (FIG. 8) initially bears the full amount of the load, as this comprises the weakest crush zone 52 at the bottom of the stanchion 40.

As the loading on the ply group 48 increases, the individual plies 46 in the ply group 48 develop interlaminer cracks that allow subsequent bending of the individual plies and ultimately, delamination and breaking of those plies. Thus, when the initial group 48 of plies 46 fail, the next group 50 of plies 46 is subjected to the load, resulting in crushing of those plies. This orderly crushing of the stanchion 40, beginning at the bottom of the stanchion 40 and propagating upwardly through successive crush zones 52, results in the stanchion 40 failing in an elastic, controlled manner, rather than buckling or shattering. As a result, the stanchions 40 are capable of absorbing a higher level of energy from the impact while aiding in maintaining the structural integrity of the aircrafts frame. As the stanchions 40 are crushing, the fuselage frame 36 is also bending, absorbing additional energy. In some cases, the floor beams 32 may likewise bend to absorb some of the crash energy. Consequently, it can be appreciated that the stanchions 40, fuselage frames 36 and floor beams 32 cooperate and function as an integrated energy absorption system.

The exact number and orientation of the stanchions 40 will vary with the particular application and aircraft design. However, as previously mentioned, in accordance with the invention, the central axes 57 of at least some of the stanchions 40 may be disposed at an angle relative to the floor beam 32 and fuselage frame 36 so as to absorb energy developed by both vertical and horizontal force components resulting from the ground impact. This is particularly important where the aircraft 20 rolls slightly before ground impact.

Attention is now directed to FIGS. 17-21 wherein an alternate stanchion 62 is depicted which is of one piece, unitary construction, and eliminates the need for the use of the previously described fittings 42. Stanchions 62 include a main body 64 provided with a pair of spaced apart, flared reinforcing flanges 68 at the upper end thereof. The upper ends of the reinforcing flanges 68 are provided with inwardly turned, oppositely facing mounting flanges 66 that extend perpendicular to flanges 68. Alternatively the mounting flanges 68 could be turned outward and attached to the roller tray 24 or other reinforcement member (not shown) in a similar manner.

Stanchion 62 may be formed from material similar to the previous discussed stanchion 40, including ply drop-offs to create crush zones exhibiting progressively less compressive strength near the outer end of the stanchions 62. The upper end of the stanchion 62 may be provided with additional ply layers and a flared flange 68 that increases the structural strength of the upper end of the stanchion 62. The stanchions 62 are provided with through holes to allow direct attachment to a floor beam 32 using fasteners 56 such as Hi-Lok® fasteners Additionally, the inwardly (or outwardly) turned, oppositely facing mounting flanges 66 provide a means of directly attaching the stanchions 62 to the roller tray 34 using fasteners 56. The lower end of the stanchion 62 may be connected to the fuselage frame 36, also using Hi-Lok® fasteners.

Stanchion 62 may be economically produced using ordinary lay-up techniques in which a tailored ply buildup with suitable ply drop-offs is created to provide a master lay-up (not shown). A water jet cutter or diamond saw (not shown) may then be used to cutout multiple individual blanks 60 from the master layup. The blanks, which are either uncured or partially cured, have an outline geometry forming various structural features of the completed stanchion 62 shown in FIG. 18. The blank 60 is then placed over a tool (not shown) and subjected to pressure and elevated temperature, using conventional techniques, to compact and fully cured the stanchion 62.

Although this invention has been described with respect to certain exemplary embodiments, it is to be understood that the specific embodiments are for purposes of illustration and not limitation, as other variations will occur to those of skill in the art.

What is claimed is:

1. An aircraft, comprising:
   a fuselage having a fuselage frame;
   a floor including floor beams within the fuselage and longitudinal beams extending transverse to the floor beams; and,
   an energy absorbing structure between the floor and the fuselage for absorbing energy in the event the fuselage is impacted, the energy absorbing structure including a plurality of energy absorbing stanchions extending between the floor beams and the fuselage, each of said energy absorbing stanchions having a first end attached to both a floor beam and a longitudinal beam, and a second end attached to the fuselage frame, and having a cross-section comprising a first pair of spaced apart flanges, each of the flanges having a taper narrowing substantially continuously from the first end to the second end of the stanchion, and having a compressive strength that progressively decreases along substantially an entire length of the stanchion between the floor beam and the fuselage frame,
   the stanchions being axially oriented at differing angles relative to the longitudinal axes of the floor beams.

2. The aircraft of claim 1, wherein the fuselage includes a curved frame.

3. The aircraft of claim 1, further comprising first and second fittings for attaching each of the stanchions to said floor beam and to said longitudinal beam, each of the fittings including first and second spaced apart flanges for reinforcing the fitting, and a third flange engaging the longitudinal beams.

4. The aircraft of claim 1, wherein each of said stanchions has a cross-section that is C-shaped.

5. The aircraft of claim 1, further comprising first and second fittings directly connected to each of said stanchions, said floor beam and said longitudinal beam.

6. The aircraft of claim 1, wherein each of the stanchions contains laminated plies of reinforced composite material, the plies having varying lengths forming reduced ply steps along the length of the stanchion from the second to the first end.

7. The aircraft of claim 6, wherein the composite material includes an epoxy and a carbon fiber reinforcement.

8. The aircraft of claim 1 wherein each of the stanchions includes:
   a second pair of flanges respectively connected to the first pair of flanges adjacent the first end of the stanchion.

9. The aircraft of claim 8, wherein the first and second pairs of flanges are integral with each other.

10. The aircraft of claim 8, wherein the second pair of flanges are attached to the longitudinal beams.

11. An energy absorbing floor structure for an aircraft, comprising:
    a floor;
    at least one floor beam for supporting the floor;
    at least one support element extending transverse to the floor beam;
    a fuselage frame;
    a plurality of energy absorbing structural members extending between the floor beam and the fuselage frame, each of said energy absorbing structural members attached to both at least one floor beam and at least one support element, each of the structural members having a first set of spaced apart flanges extending from a first end of the member to a second end of the member, each of said members comprising a C-shaped cross-section, said first set of spaced apart flanges having a taper narrowing substantially continuously from the first end to the second end of the member, and a second set of flanges on one end of said structural member engaging the floor beam and said support element; and,
    means for attaching the each of the structural members to the fuselage frame, the floor beam and the support element.

12. The energy absorbing floor structure of claim 11, wherein:
    each of the structural members is formed from laminated plies of a composite material and includes ply drop-offs along is length.

13. The energy absorbing floor structure of claim 11, wherein the first set of flanges extends generally perpendicular to the second set of flanges.

14. The energy absorbing floor structure of claim 11, wherein each of the structural members is formed from composite material and the first and second flanges are formed integral with each other.

15. The energy absorbing floor structure of claim 14, wherein the fastening means includes:
    a first set of fasteners extending through each of the structural members into the floor beam, and
    a second set of fasteners extending through the second set of flanges into the support element.

\* \* \* \* \*